(12) United States Patent
Gaeta

(10) Patent No.: US 8,545,582 B2
(45) Date of Patent: Oct. 1, 2013

(54) ABRASIVE ARTICLES INCLUDING FUSED ZIRCONIA ALUMINA GRAIN HAVING AN IMPROVED SHAPE

(75) Inventor: Anthony C. Gaeta, Lockport, NY (US)

(73) Assignees: Saint-Gobain Abrasives, Inc., Worcester, MA (US); Saint-Gobain Abrasifs, Conflans-Sainte-Honorine (FR)

( * ) Notice: Subject to any disclaimer, the term of this patent is extended or adjusted under 35 U.S.C. 154(b) by 719 days.

(21) Appl. No.: 12/722,295

(22) Filed: Mar. 11, 2010

(65) Prior Publication Data

US 2010/0251625 A1    Oct. 7, 2010

Related U.S. Application Data

(60) Provisional application No. 61/159,220, filed on Mar. 11, 2009.

(51) Int. Cl.
*B24D 3/00*       (2006.01)
*C09K 3/14*       (2006.01)

(52) U.S. Cl.
USPC .............................................. 51/297; 51/309

(58) Field of Classification Search
None
See application file for complete search history.

(56) References Cited

U.S. PATENT DOCUMENTS

| | | |
|---|---|---|
| 3,181,939 A | 5/1965 | Marshall et al. |
| 3,891,408 A | 6/1975 | Rowse et al. |
| 3,913,119 A | 10/1975 | Pfeifer et al. |
| 4,059,417 A | 11/1977 | Ilmaier et al. |
| 4,194,887 A | 3/1980 | Ueltz et al. |
| 4,457,767 A | 7/1984 | Poon et al. |
| 5,161,696 A | 11/1992 | Seider |
| 5,378,251 A * | 1/1995 | Culler et al. ................... 51/295 |
| 2003/0145525 A1 | 8/2003 | Rosenflanz |
| 2005/0060948 A1 * | 3/2005 | Rosenflanz ................... 51/308 |
| 2007/0132058 A1 | 6/2007 | Yi et al. |
| 2007/0155293 A1 | 7/2007 | Endres et al. |
| 2008/0026583 A1 | 1/2008 | Hardy et al. |
| 2008/0028685 A1 * | 2/2008 | Marlin ........................... 51/309 |
| 2008/0139684 A1 | 6/2008 | Swisher et al. |

FOREIGN PATENT DOCUMENTS

| | | |
|---|---|---|
| DE | 4306966 C1 | 1/1994 |
| EP | 1765743 A1 | 2/2006 |
| FR | 2787106 A1 | 6/2000 |
| FR | 2872157 A1 | 12/2005 |

\* cited by examiner

*Primary Examiner* — Pegah Parvini
*Assistant Examiner* — Jared Wood
(74) *Attorney, Agent, or Firm* — Joseph P. Sullivan; Abel Law Group, LLP

(57) ABSTRACT

A coated abrasive article includes a backing and fused alumina-zirconia abrasive grains attached to the backing with a binder. The fused alumina-zirconia abrasive grains include between about 35 wt % and about 45.5 wt % $ZrO_2+HfO_2$, between about 43.7 wt % and about 65 wt % $Al_2O_3$, less than about 0.8 wt % $SiO_2$ and less than about 10 wt % other oxides. The fused alumina-zirconia abrasive grains simultaneously satisfy both a granulometric and densimetric condition.

25 Claims, 5 Drawing Sheets

| Grain Designation | Sieve 1 | | Sieve 1 | Sieve 2 | | Sieve 2 | Sieve 3 | | Sieve 3 | Sieve 4 | | Sieve 4 | Sieve 5 | | Sieve 5 | Passing through |
| | Mesh Size | | Stopped by Sieve 1 | Mesh Size | | Stopped by Sieve 1+2 | Mesh Size | | Stopped by Sieve 1+2+3 | Mesh Size | | Stopped by Sieve 1+2+3+4 | Mesh Size | | Stopped by Sieve 1+2+3+4+5 | $Q_{max}$ |
| | a | | $Q_1$ | a | | $Q_2$ max | a | | $Q_3$ | a | | $Q_4$ | a | | $Q_5$ min | |
| | mm | µm | % | mm | µm | % | mm | µm | % | mm | µm | % | mm | µm | % | % |
| P 12 | 3,35 | - | 0 | 2,36 | - | 1 | 2,00 | - | 14 +/- 4 | 1,70 | - | 61 +/- 9 | 1,40 | - | 92 | 8 |
| P 16 | 2,36 | - | 0 | 1,70 | - | 3 | 1,40 | - | 26 +/- 6 | 1,18 | - | 75 +/- 9 | 1,00 | - | 96 | 4 |
| P 20 | 1,70 | - | 0 | 1,18 | - | 7 | 1,00 | - | 42 +/- 8 | - | 850 | 86 +/- 6 | - | 710 | 96 | 4 |
| P 24 | 1,40 | - | 0 | 1,00 | - | 1 | - | 850 | 14 +/- 4 | - | 710 | 61 +/- 9 | - | 600 | 92 | 8 |
| P 30 | 1,18 | - | 0 | - | 850 | 1 | - | 710 | 14 +/- 4 | - | 600 | 61 +/- 9 | - | 500 | 92 | 8 |
| P 36 | 1,00 | - | 0 | - | 710 | 1 | - | 600 | 14 +/- 4 | - | 500 | 61 +/- 9 | - | 425 | 92 | 8 |
| P 40 | - | 710 | 0 | - | 500 | 7 | - | 425 | 42 +/- 8 | - | 355 | 86 +/- 6 | - | 300 | 96 | 4 |
| P 50 | - | 600 | 0 | - | 425 | 3 | - | 355 | 26 +/- 6 | - | 300 | 75 +/- 9 | - | 250 | 96 | 4 |
| P 60 | - | 500 | 0 | - | 355 | 1 | - | 300 | 14 +/- 4 | - | 250 | 61 +/- 9 | - | 212 | 92 | 8 |
| P 80 | - | 355 | 0 | - | 250 | 3 | - | 212 | 26 +/- 6 | - | 180 | 75 +/- 9 | - | 150 | 96 | 4 |
| P 100 | - | 300 | 0 | - | 212 | 1 | - | 180 | 14 +/- 4 | - | 150 | 61 +/- 9 | - | 125 | 92 | 8 |
| P 120 | - | 212 | 0 | - | 150 | 7 | - | 125 | 42 +/- 8 | - | 106 | 86 +/- 6 | - | 90 | 96 | 4 |
| P 150 | - | 180 | 0 | - | 125 | 3 | - | 106 | 26 +/- 6 | - | 90 | 75 +/- 9 | - | 75 | 96 | 4 |
| P 180 | - | 150 | 0 | - | 106 | 2 | - | 90 | 15 +/- 5 | - | 75 | 62 +/- 12 | - | 63 | 90 | 10 |
| P 220 | - | 125 | 0 | - | 90 | 2 | - | 75 | 15 +/- 5 | - | 63 | 62 +/- 12 | - | 53 | 90 | 10 |

| Grain Designation | Sieve 1 | | Sieve 2 | | Sieve 3 | | Sieve 4 | | Sieve 5 | | Passing through |
|---|---|---|---|---|---|---|---|---|---|---|---|
| | Mesh Size | Stopped by Sieve 1 | Mesh Size | Stopped by Sieve 2 | Mesh Size | Stopped by Sieve 3 | Mesh Size | Stopped by Sieve 3+4 | Mesh Size | Stopped by Sieve 3+4+5 | |
| | a | $Q_1$ | a | $Q_2$ max | a | $Q_3$ min | a | $Q_3 + Q_4$ min | a | $Q_3 + Q_4 + Q_5$ min | $Q$ max |
| | mm \| μm | % | mm \| μm | % | mm \| μm | % | mm \| μm | % | mm \| μm | % | % |
| F 10 | 3.35 \| - | 0 | 2.36 \| - | 20 | 2.00 \| - | 45 | 1.70 \| - | 70 | 1.40 \| - | 97 | 3 |

| | ZrO$_2$ (%) | Al$_2$O$_3$ (%) | Y$_2$O$_3$ (%) | TiO$_2$ (%) | SiO$_2$ (%) | Impurities (%) | Nodule Concentration (number/mm2) | % Grains with Inclusions | % Grains with primary zirconia | % Grains with primary corundum | Loose Packed Density (g/cm$^3$) |
|---|---|---|---|---|---|---|---|---|---|---|---|
| Standard NZP Grit P24 | 40.7 | 57.85 | 0.75 | 0.1 | 0.31 | 0.29 | - | - | - | - | 2.16 |
| Weak NZP Grit P24 | 40.7 | 57.91 | 0.71 | 0.08 | 0.37 | 0.23 | - | - | - | - | 2.06 |
| Standard mNZP Grit P24 | 44.8 | 54.27 | 0.56 | 0.09 | 0.1 | 0.18 | 3272 | 2.5 | 36 | 3 | 2.14 |
| Weak mNZP Grit P24 | 44.4 | 54.69 | 0.54 | 0.1 | 0.1 | 0.17 | 1230 | 0.7 | 36 | 2 | 2.04 |
| Standard NZP Grit P36 | 39.8 | 58.86 | 0.74 | 0.08 | 0.28 | 0.24 | - | - | - | - | 2.01 |
| Weak NZP Grit P36 | 38.6 | 60.09 | 0.72 | 0.07 | 0.25 | 0.27 | - | - | - | - | 1.92 |
| Standard mNZP Grit P36 | 44.6 | 54.44 | 0.58 | 0.1 | 0.1 | 0.18 | 2129 | 1.2 | 39 | 5 | 2.02 |
| Weak mNZP Grit P36 | 44.2 | 54.77 | 0.65 | 0.1 | 0.1 | 0.18 | 4842 | 1 | 44 | <1 | 1.95 |
| standards NZP Grit P40 | 41 | 57.51 | 0.76 | 0.13 | 0.3 | 0.3 | - | - | - | - | 1.97 |
| Weak NZP Grit P40 | 38.9 | 59.74 | 0.71 | 0.1 | 0.27 | 0.28 | - | - | - | - | 1.92 |
| Standard mNZP Grit P40 | 45 | 54.04 | 0.55 | 0.1 | 0.11 | 0.2 | 2307 | 0.8 | 44 | 2 | 1.97 |
| Weak mNZP Grit P40 | 44.4 | 54.73 | 0.53 | 0.08 | 0.1 | 0.16 | 2885 | 0.8 | 31 | 4 | 1.93 |

*FIG. 3*

ABRASIVE ARTICLES INCLUDING FUSED ZIRCONIA ALUMINA GRAIN HAVING AN IMPROVED SHAPE

CROSS-REFERENCE TO RELATED APPLICATION(S)

The present application claims priority from U.S. Provisional Patent Application No. 61/159,220, filed Mar. 11, 2009, entitled "ABRASIVE ARTICLES INCLUDING FUSED ZIRCONIA ALUMINA GRAIN HAVING AN IMPROVED SHAPE," naming inventor Anthony C. Gaeta, which application is incorporated by reference herein in its entirety.

FIELD OF THE DISCLOSURE

The present disclosure generally relates to abrasive articles and, more particularly relates to abrasive articles including fused zirconia alumina grain having an improved shape.

BACKGROUND

Abrasive products generally contain or are formed from abrasive particulate material. Such abrasive particulate material can be used as a free abrasive, such as in the form of a slurry, or a fixed abrasive, typically either a coated abrasive or a bonded abrasive article. Abrasive articles, such as coated abrasive articles, are used in various industries to machine work pieces, such as by lapping, grinding, or polishing. Machining utilizing abrasive articles spans a wide industrial scope from optics industries, automotive paint repair industries to metal fabrication industries. Machining, such as by hand or with use of commonly available tools such as orbital polishers (both random and fixed axis), and belt and vibratory sanders, is also commonly done by consumers in household applications. In each of these examples, manufacturing facilities use abrasives to remove bulk material or affect surface characteristics of products. Various types of automated processing systems have been developed to abrasively process articles of various compositions and configurations. For example, coated abrasive strips, rolls or tapes, fed from automatic abrasive feed machines are employed to process parts, such as automobile and powertrain parts (e.g., crankshaft, camshaft, transmission shaft, steering shaft, steering rod).

As an abrasive article is utilized, the abrasive properties are diminished through wear as sharp edges are dulled. Controlled breakage, such as through microfractures, of the abrasive particles can continually renew the abrasive surface and extend the life of the abrasive article. However, loss of abrasive particles eventually results in a worn abrasive article that is no longer useful and must be replaced.

Abrasive particle formation, such as through chemical synthesis routes or through bulk material processing routes (e.g., fusion and comminution), is considered a fairly well developed and mature art area. However, the industry continues to demand even further improved particulate materials that may offer enhanced machining performance and increased lifespan.

SUMMARY

In an embodiment, a coated abrasive article can include a backing and fused alumina-zirconia abrasive grains attached to the backing with a binder. The fused alumina-zirconia abrasive grains can include between about 35 wt % and about 45.5 wt % $ZrO_2+HfO_2$, between about 43.7 wt % and about 65 wt % $Al_2O_3$, less than about 0.8 wt % $SiO_2$ and less than about 10 wt % other oxides. In a particular embodiment, the coated abrasive article can have a 2.3 Material Removal Rate (MRR) Wear Rating of at least about 105. In another particular embodiment, the coated abrasive article can have a 5.9 MRR Wear Rating of at least about 110. In yet another particular embodiment, the fused alumina-zirconia abrasive grains can conform to at least one of the following conditions:

(1) at least about 97 wt % of the grains do not cross a 1400 µm square mesh sieve and at most about 20 wt % of the grains do not cross a 2360 µm square mesh sieve, and the loose packed density is between about 2.18 and about 2.43

(2) at least about 96 wt % of the grains do not cross a 1000 µm square mesh sieve and at most about 3 wt % of the grains do not cross a 1700 µm square mesh sieve, and the loose packed density is between about 2.04 and about 2.26;

(3) at least about 92 wt % of the grains do not cross a 600 µm square mesh sieve and at most about 18 wt % of the grains do not cross a 850 µm square mesh sieve, and the loose packed density is between about 1.94 and about 2.17;

(4) not more than 5% of the grains contain inclusions, at least 50% of the grains containing at least about 500 nodules per $mm^2$, at least about 92 wt % of the grains do not cross a 425 µm square mesh sieve and at most about 18 wt % of the grains does not cross a 600 µm square mesh sieve, and the loose packed density is between about 1.85 and about 2.05;

(5) not more than 5% of the grains contain inclusions, at least 50% of the grains containing at least about 500 nodules per $mm^2$, at least about 96 wt % of the grains do not cross a 300 µm square mesh sieve and at most about 7 wt % of the grains do not cross a 500 µm square mesh sieve, and the loose packed density is between about 1.83 and about 2.00;

(6) not more than 5% of the grains contain inclusions, at least 50% of the grains containing at least about 500 nodules per $mm^2$, at least about 96 wt % of the grains do not cross a 250 µm square mesh sieve and at most about 3 wt % of the grains do not cross a 425 µm square mesh sieve, and the loose packed density is at least about 1.82 and at least about 1.95;

(7) not more than 5% of the grains contain inclusions, at least 50% of the grains containing at least about 500 nodules per $mm^2$, at least about 96 wt % of the grains do not cross a 150 µm square mesh sieve and at most about 3 wt % of the grains do not cross a 250 µm square mesh sieve, and the loose packed density is between about 1.79 and about 1.93.

In another embodiment, a method of forming a coated abrasive article can include applying a coating to a backing, and applying fused alumina-zirconia abrasive grains to the adhesive coating. The fused alumina-zirconia abrasive grains can include between about 35 wt % and about 45.5 wt % $ZrO_2+HfO_2$, between about 43.7 wt % and about 65 wt % $Al_2O_3$, less than about 0.8 wt % $SiO_2$ and less than about 10 wt % other oxides. The fused alumina-zirconia abrasive grains can conform to one of conditions (1) through (7) listed above.

BRIEF DESCRIPTION OF THE DRAWINGS

The present disclosure may be better understood, and its numerous features and advantages made apparent to those skilled in the art by referencing the accompanying drawings.

FIG. 1 provides the granulometric characteristics of grits P16, P24, P36, P40, P50, and P80.

FIG. 2 provides the granulometric characteristics of grit F10.

FIG. 3 provides the chemical composition and the loose packed density of the examples.

The use of the same reference symbols in different drawings indicates similar or identical items.

DETAILED DESCRIPTION

Figure 4:
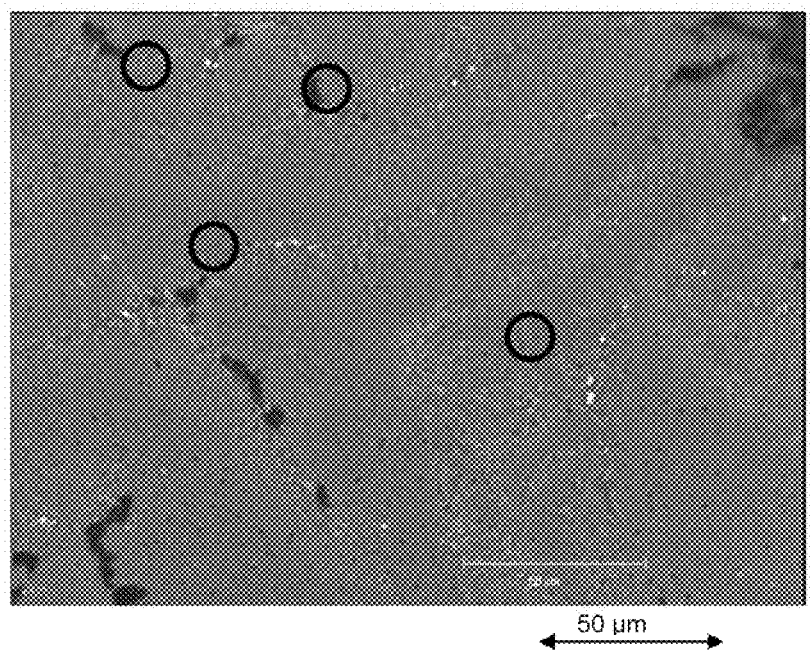
FIGS. 4 through 7 represent photographs of the surface of mNZP grains showing nodules, an inclusion, a primary corundum dendrite, and a primary zirconium dendrite, respectively.

In an embodiment, fused alumina-zirconia grains can include between about 35 wt % and about 45.5 wt % $ZrO_2$+ $HfO_2$, between about 43.7 wt % and about 65 wt % $Al_2O_3$, less than about 0.8 wt % $SiO_2$, and less than about 10 wt % other oxides. The fused alumina-zirconia grains can have a loose packed density (LPD) according to at least one of the following conditions:

(1) at least about 97 wt % of the grains do not cross a 1400 μm square mesh sieve and at most about 20 wt % of the grains do not cross a 2360 μm square mesh sieve (granulometric condition C1), and the loose packed density is between about 2.18 and about 2.43, preferable at least about 2.22 and not greater than about 2.36 (densimetric condition D1);

(2) at least about 96 wt % of the grains do not cross a 1000 μm square mesh sieve and at most about 3 wt % of the grains do not cross a 1700 μm square mesh sieve (granulometric condition C2), and the loose packed density is between about 2.04 and about 2.26, preferable at least about 2.08 and not greater than about 2.17 (densimetric condition D2);

(3) at least about 92 wt % of the grains do not cross a 600 μm square mesh sieve and at most about 18 wt % of the grains do not cross a 850 μm square mesh sieve, (granulometric condition C3), and the loose packed density is between about 1.94 and about 2.17; preferably at least about 1.98 and not greater than about 2.05 (densimetric condition D3);

(4) not more than 5% of the grains contain inclusions, at least 50% of the grains containing at least about 500 nodules per $mm^2$, at least about 92 wt % of the grains do not cross a 425 μm square mesh sieve and at most about 18 wt % of the grains does not cross a 600 μm square mesh sieve (granulometric condition C4), and the loose packed density is between about 1.85 and about 2.05; preferably at least about 1.89 and not greater than about 1.91 (densimetric condition D4);

(5) not more than 5% of the grains contain inclusions, at least 50% of the grains containing at least about 500 nodules per $mm^2$, at least about 96 wt % of the grains do not cross a 300 μm square mesh sieve and at most about 7 wt % of the grains do not cross a 500 μm square mesh sieve (granulometric condition C5), and the loose packed density is between about 1.83 and about 2.00; preferably at least about 1.86 and not greater than about 1.97 (densimetric condition D5);

(6) not more than 5% of the grains contain inclusions, at least 50% of the grains containing at least about 500 nodules per $mm^2$, at least about 96 wt % of the grains do not cross a 250 μm square mesh sieve and at most about 3 wt % of the grains do not cross a 425 μm square mesh sieve (granulometric condition C6), and the loose packed density is at least about 1.82 and at least about 1.95, preferably at least about 1.86 and not greater than about 1.93 (densimetric condition D6);

(7) not more than 5% of the grains contain inclusions, at least 50% of the grains containing at least about 500 nodules per $mm^2$, at least about 96 wt % of the grains do not cross a 150 μm square mesh sieve and at most about 3 wt % of the grains do not cross a 250 μm square mesh sieve (granulometric condition C7), and the loose packed density is between about 1.79 and about 1.93, preferably at least about 1.83 and not greater than about 1.91 (densimetric condition D7).

Contrary to the teachings of U.S. Pat. No. 5,161,696, the inventors discovered that it may not be sufficient to increase the quantity of abrasive grains presenting a lengthened form to increase the lifespan of the grains. They discovered that this effect can depend on the chemical composition of the grains and that, for a determined composition, a precise correlation between the loose packed density of a mixture and its granulometric distribution can be essential.

In a particular embodiment, the fused alumina-zirconia abrasive grains can include between about 38 wt % and about 45.5 wt %, such as between about 40 wt % and 45.5 wt %, even between about 42 wt % and about 44 wt % $ZrO_2$+$HfO_2$, and between about 43.7 wt % and about 62 wt %, such as between about 43.7 wt % and about 60 wt %, even between about 45.2 wt % and about 58 wt % $Al_2O_3$.

In another particular embodiment, the other oxides can include an additive of less than about 10 wt % of the fused alumina-zirconia grains. The additive can include yttrium oxide, titanium oxide, magnesium oxides, calcium oxide, rare earth oxides, or any combination thereof. The rare earth oxides can include oxides of neodymium, lanthanum, cerium, dysprosium, erbium, or any combination thereof. Particularly, the fused alumina-zirconia abrasive grains can include between about 0.1 wt % and about 1.2 wt %, such as between about 0.4 wt % and 0.6 wt %, of $Y_2O_3$. Further, the fused alumina-zirconia abrasive grains can include less than about 3.0 wt % $TiO_2$, less than about 0.4 wt % $SiO_2$, and less than about 1.2 wt % impurities. Further, the $TiO_2$ can be in an amount of less than about 0.5 wt %, such as less than about 0.2 wt %, even less than about 0.15 wt %. Generally, when $TiO_2$ is present, the $TiO_2$ can be in an amount of at least about 0.01 wt %.

Additionally, grains corresponding to the conditions (1), (2), (3), (4), (5), (6) or (7) can present Grit F10, P16, P24, P36, P40, P50, or P80, respectively, being measured according to standard FEPA Standard 42-GB 1984, R 1993 for the grits F10 and according to standard FEPA Standard 43-GB 1984, R 1993 for the grits P16, P24, P36, P40, P50 or P80, of the European Federation of the Manufacturers of Grittings, generally used in the field of the abrasive grains.

Preferably, the fused alumina-zirconia abrasive grains includes less than about 5%, such as less than about 2%, grains containing inclusions. Additionally, at least about 50%, such as at least about 80%, even 90% of the grains containing at least about 500 nodules per $mm^2$. For example, such mixtures of fused alumina-zirconia abrasive grains are described in FR 2,872,157. As used herein, "mNZP" refers to grains as described in FR 2,872,157

The inventors discovered that the conditions (1) to (7) above could increase the lifespan of the mNZP fused alumina-zirconia abrasive grains. The lifespan can be 30%, 40%, even 50% higher than those obtained starting from the mixtures of current grains.

In an embodiment, at least about 50%, preferably at least about 80%, at least about 90%, even at least about 99% of the fused alumina-zirconia abrasive grains can have a concentration of nodules higher than 500 nodules per $mm^2$. Additionally, the concentration of nodules can be between about 600 and about 3500 nodules per $mm^2$. Preferably, the concentration of nodules can be at least about 900 nodules per $mm^2$. Additionally, the concentration of nodules can be not greater than about 2500 nodules per $mm^2$, such as not greater than about 2000 nodules/$mm^2$, even not greater than about 1500 nodules/$mm^2$. Additionally, less than about 5%, preferable less than about 4%, even less than about 2% of the fused alumina-zirconia abrasive grains can have inclusions. Further, less than about 1.5% of the mNZP grains can contain inclusions. Between about 20% and 45% of the fused alumina-zirconia abrasive grains can include primary zirconia. Between 0 and about 20%, preferably between 0 and about 10% of the fused alumina-zirconia abrasive grains can include primary corundum.

In an embodiment, the fused alumina-zirconia abrasive grains can conform to one or more characteristics of the fused alumina-zirconia abrasive grains as described in FR 2,872,157.

In another particular embodiment, less than about 2%, preferably 1.5%, of the mNZP grains having a size ranging between 500 µm and 600 µm can include inclusions, and between about 20% and 45% of the mNZP grains having a size ranging between 500 lam and 600 µm can contain primary zirconia and/or between 0 and about 20% of the mNZP grains having a size ranging between 500 µm and 600 µm can contain primary corundum.

In an embodiment, a coated abrasive article can include a plurality of the fused alumina-zirconia abrasive grains described above attached to a backing with a binder or deposited in a layer on a backing and retained by a binder. The coated abrasive article can have a 2.3 MRR Wear Rating of at least about 105. Additionally, the coated abrasive article can have a 5.9 MRR Wear Rating of about 110.

In a particular embodiment, the coated abrasive article can be a 24 grit abrasive article. The 24 grit abrasive article can have a 2.3 MRR Wear Rating of at least about 150, such as at least about 165, even at least about 180. Additionally, the 24 grit abrasive article can have a 2.3 MRR Wear Volume of at least about 170 $in^3$, such as at least about 225 $in^3$, even at least about 280 $in^3$. Alternatively, the 24 grit abrasive article can have a 5.9 MRR Wear Rating of at least about 140, such as at least about 160, even at least about 180. Further the 24 grit abrasive article can have a 5.9 MRR Wear Volume of at least about 180 $in^3$, such as at least about 220 $in^3$, even at least about 250 $in^3$.

In another particular embodiment, the coated abrasive article can be a 36 grit abrasive article. The 36 grit abrasive article can have a 2.3 MRR Wear Rating of at least about 110, such as at least about 120 even at least about 130. Additionally, the 36 grit abrasive article can have a 2.3 MRR Wear Volume of at least about 150 $in^3$, such as at least about 175 $in^3$, even at least about 200 $in^3$. Alternatively, the 36 grit abrasive article can have a 5.9 MRR Wear Rating of at least about 120, such as at least about 135, even at least about 150. Further the 36 grit abrasive article can have a 5.9 MRR Wear Volume of at least about 110 $in^3$, such as at least about 130 $in^3$, even at least about 150 $in^3$.

In another particular embodiment, the coated abrasive article can be a 40 grit abrasive article. The 40 grit abrasive article can have a 2.3 MRR Wear Rating of at least about 110, such as at least about 115 even at least about 135. Additionally, the 40 grit abrasive article can have a 2.3 MRR Wear Volume of at least about 135 $in^3$, such as at least about 145 $in^3$, even at least about 155 $in^3$. Alternatively, the 40 grit abrasive article can have a 5.9 MRR Wear Rating of at least about 120, such as at least about 130. Further the 40 grit abrasive article can have a 5.9 MRR Wear Volume of at least about 65 $in^3$, such as at least about 70 $in^3$, even at least about 75 $in^3$.

The loose packed density (LPD) of a mixture of grains is the mass of grains contained in a defined volume, without application of pressure aiming at increasing the aforementioned mass. The LPD is measured in accordance with standard ANSI B74.4-1992.

The oxides content of a grain of the mixture according to the invention refer to the total content for each corresponding chemical element, expressed in the shape of the most stable oxide.

As defined herein, "impurities" refers to undesirable components inadvertently introduces with the raw materials. In particular, impurities can include oxides, nitrides, oxynitrides, carbides, oxycarbides, carbonitrides, and metal species of sodium and other alkaline metals, iron, vanadium, and chromium. For example, the impurities can include $Fe_2O_3$ or $Na_2O$. Additionally, impurities can include residual carbon. However, hafnium oxide, introduced along with the zirconia is not typically regarded as an impurity.

In a product obtained by fusion, $HfO_2$ is not typically chemically dissociable of $ZrO_2$. In the chemical composition of such a product, $ZrO_2+HfO_2$ thus indicates the total content of these two oxides. However, $HfO_2$ may not be added voluntarily in the starting load. $HfO_2$ thus can indicate traces of hafnium oxide naturally present in the sources of zirconia at contents generally lower than 2%. Accordingly, $ZrO_2+HfO_2$ or $ZrO_2$ can be used interchangeably to indicate the amount of zirconia.

As used herein, "additive" refers to additives used for the manufacture of fused alumina zirconia grains particularly for stabilizing the zirconia, specifically yttrium oxide and titanium oxide. Moreover, additives can include oxides of magnesium, calcium, and rare earths, particularly neodymium, lanthanum, cerium, dysprosium, and erbium. Additive also includes mixtures of the aforesaid species.

In an embodiment, the abrasive grains include an amount of $ZrO_2+HfO_2$ ranging between about 35 wt % and about 45.5% in order to support the formation of eutectic structures. Preferably, the zirconia of the grains is present mainly in its quadratic allotropic form rather than the monoclinic form.

The term "nodule" refers to a particle whose principle component is a metal or metal alloy (generally Al, Zr, or ZrSi) or is a carbide or combination of carbides (generally ZrC or AlC) and the size of which does not exceed 10 µm. The nodules are mainly present in the form of substantially spherical and discrete particles (isolated from one another). The nodule concentration is the number of nodules per $mm^2$ of area of a cross section of a grain.

The term "inclusion" refers to a particle whose primary component is a carbide or combination of carbides, generally ZrC, and having a size greater than 10 µm. The inclusions are mainly present in an elongate form, consisting of a series or a cluster of particles in contact with one another. The particles each have a carbide or combination of carbides as a primary component. The content of grains containing inclusions is the percentage by number of grains containing at least one inclusion.

The "size" of a nodule or of an inclusion is defined by its greatest dimension measured in the plane of observation of a polished section.

Figure 7:
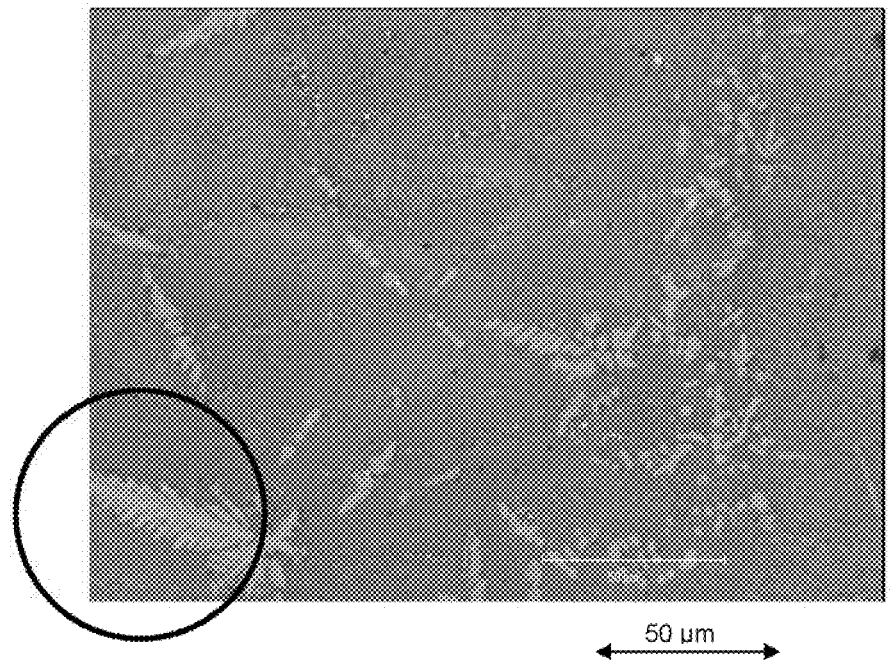

The term "primary zirconia" usually refers to a dendrite whose primary component is zirconia. The primary zirconia rate is the percentage of grains on a polished section having primary zirconia. As shown in FIG. 7, primary zirconia appears light gray under the microscope.

Figure 6:
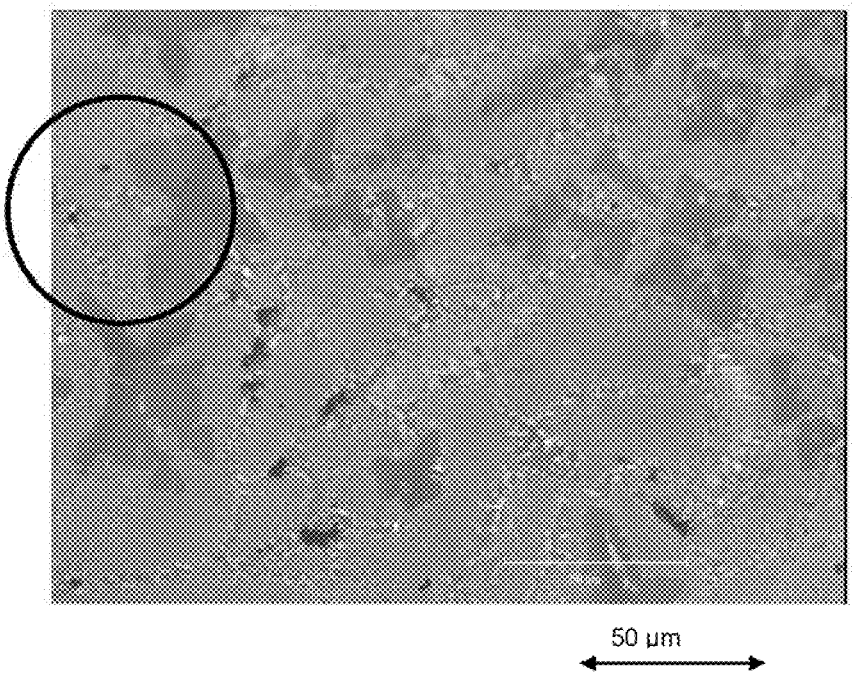

The term "primary corundum" usually refers to a dendrite whose primary component is alumina. As shown in FIG. 6, primary corundum appears dark gray under the microscope. The primary corundum rate is the percentage of grains on a polished section having primary corundum.

The term "dendrite" refers to a crystal obtained after growth and having a fractal or pseudo fractal geometry.

The term "primary component" refers to the component having the highest content. Generally and without that being restrictive, this content of mass is higher than 50%, even higher than 80%.

The term "fused" generally refers to a solid grain (or product) obtained by solidification through cooling of a melt. A "melt" is a liquid mass which can contain some solid particles, but in an insufficient quantity to structure the liquid mass. To preserve its form, a melt must be contained in a container.

In present description, except where otherwise stated, all the compositions of a grain are given in mass percentages, on the basis of total mass of the grain.

The grains may be manufactured by any conventional process for manufacturing fused alumina/zirconia grains, to which a final selection step is added. For example, a conventional process usually comprises the following steps: mixing with the raw materials, melting in an electric arc furnace, rapid cooling of the molten liquid, milling, and, optionally, classification according to the grit size distribution.

The properties of the fused alumina/zirconia grains depend on the thermal behavior of the molten liquid, which itself depends on the process parameters but also strongly on the geometry of the furnace and its environment (flue gas collection, materials, etc.). The values of the process parameters are therefore determined according to the furnace employed, the raw materials used, etc., so as to obtain a mixture of grains according to the invention at the end of these steps. The parameters may for example take the values of the process used for the examples below.

The grains can be manufactured according to conventional processes for manufacturing alumina-zirconia grains. For example, A) Mix the selected raw materials so that the grains of the mixture obtained at the conclusion of the stage D) have a chemical composition conforms to the chemical composition according to the invention, B) melting the mixed raw materials until liquid, for example in an arc furnace, C) hardening by cooling the liquid, preferably so that the molten liquid is solidified in less than 3 minutes, until obtaining a solid mass, D) crushing the solid mass to obtain a mixture of grains, in particular by means of a roller crusher, E) determining, for example by sampling, the concentration of nodules of the grains and the percentage of grains containing inclusions and if necessary, modifying the parameters of the B) and/or C) and repeating A) through D), F) optionally, sifting the grains obtained at the stage D), and G) determining that the grains conform to at least one of the conditions (1) to (7) at the conclusion of the stage D) or the stage F). If the grains do not conform to the aforesaid conditions, the grains can be modified for example by crushing and/or additional sifting or mixing with grains presenting the different characteristics, so that it conforms with the aforesaid conditions.

In an embodiment, grains not conforming to at least one of conditions (1) to (7) can be combined with additional grains of comparable nature (composition, microstructure), and conforming to the same granulometric condition (to preserve the aforementioned granulometric condition), but whose grains present, on average, a different morphology. For example, the addition of such a mixture of grains presenting, on average, more lengthened form makes it possible to decrease the loose packed density.

In another embodiment, the grains can be crushed to modify the average morphology. For example, a passage through a roller crusher increases the proportion of lengthened grains, and thus decreasing the loose packed density. However, crushing can reduce the size of the grains and lead to a mixture of grains not observing the aforementioned granulometric condition.

In an embodiment, the fused alumina-zirconia abrasive grains can be combined with a resin material used to adhere the grains onto a surface of a substrate. Processes for combining the grains with the resin bonding material include placing grains on a resin coated substrate through electrostatic attraction or simply through gravity (e.g., sprinkled on the substrate), or in a distinct processing pathway, forming a slurry, in which the grains, resin and other additives are combined together and coated on a substrate.

Placing grains on a resin coated substrate is well understood in the art, generally first depositing a 'make coat' on the substrate, aggregate application on the make coat, and subsequent deposition of a 'size coat.' Optionally, a supersize coat may be deposited over the size coat. Further, a compliant coat may be disposed between the make coat and the substrate. In another example, a back coat may be disposed over the substrate on a side opposite the make coat. The coat layers can include polymeric resins materials, such as phenolic resins, acrylic latex, polyesters, epoxy resins, polyurethanes, polyamides, polyacrylates, polymethacrylates, poly vinyl chlorides, polyethylene, polysiloxane, silicones, cellulose acetates, nitrocellulose, natural rubber, starch, shellac, and mixtures thereof. Additionally, the various coats can include various fillers, including $KBF_4$, synthetic cryolite, calcium carbonate, other suitable fillers known in the art, or any combination thereof.

In connection with slurry coating a substrate, in addition to the grains, the slurry generally also includes a solvent such as water or an organic solvent and a polymeric resin material. Suitable polymeric resin materials include polyesters, epoxy resins, polyurethanes, polyamides, polyacrylates, polymethacrylates, poly vinyl chlorides, polyethylene, polysiloxane, silicones, cellulose acetates, nitrocellulose, natural rubber, starch, shellac, and mixtures thereof. The slurry may additionally comprise other ingredients to form a binder system designed to bond the fused alumina-zirconia grains onto a substrate. The slurry composition is thoroughly mixed using, for example, a high shear mixer.

The slurry containing the fused alumina-zirconia grains can be applied to the substrate using a blade spreader to form a coating. Alternatively, the slurry coating may be applied using slot die, gravure, or reverse gravure coating methods. The coating thickness may range from about 1 to about 5 mils in thickness, after drying. As the substrate is fed under the blade spreader at a desired coat speed, the fused alumina-zirconia grain slurry is applied to the substrate in the desired thickness. The coat speed is preferably between about 10 to about 40 feet per minute.

The coated substrate is then heated in order to cure the resin and bond the aggregate grains to the substrate. In general, the coated substrate is heated to a temperature of between about 100° C. to less than about 150° C. during this curing process. In certain embodiments of the present disclosure, it is preferred that the curing step be carried at a temperature of less than about 130° C.

Once the resin is cured and the fused alumina-zirconia abrasive grains are bonded to the substrate, and the coated substrate may be used for a variety of abrasive applications.

In an alternative embodiment of the present disclosure, the abrasive grains may be directly incorporated into the substrate. For instance, the aggregates may be mixed a polyester resin and this mixture of aggregates and polymer may then be formed into a substrate.

In a still alternative embodiment of the present disclosure, the abrasive grains may be applied to a substrate coated with an adhesive and then sealed. This coating technique is similar that typically used for traditional sandpaper, and is referenced above. In this embodiment, the abrasive grains are preferably not mixed into a slurry. Instead the abrasive powder containing the grains is preferably fed onto a substrate to which an adhesive has already been applied, the make coat, followed by sealing via the size coat. Optionally, the substrate may be pre-treated with a compliant coat or a back coat.

In an alternative embodiment of the present disclosure, the fused alumina-zirconia abrasive grains could be applied to substrates or other materials by electroplating, electric-static, spray coating and spray powder coating methods.

EXAMPLES

The following nonlimiting examples are given for the purpose of illustrating the invention.

The concentration of nodules, the inclusion rate, the primary zirconia rate, and the primary corundum rate is measured by visual inspection of photographs. The photographs (FIGS. 4 through 7) are obtained using a Reichert® microscope connected to a image analysis station equipped with Visilog® software. Measurements are carried out on a polished section, called a "polishing", 25 mm in diameter, of a cylindrical unit consisting of abrasive grains embedded in a transparent organic resin. The grains incorporated in a polishing having a size which is a function of the conditions (1) to (7), such as defined in Table 1 below:

TABLE 1

Parameters for observing nodules, inclusions, primary zirconia, and primary corundum.

| Criteria | Size of grains taken for observation (μm) | Magnification used for the observation of the nodules (G1) | Magnification used for the observation of the inclusions (G2) | Magnification used for the observation of the primary zirconia and the primary corundum (G3) |
|---|---|---|---|---|
| (1) | 2000-2360 | 80x | 20x | 40x |
| (2) | 1180-1400 | 160x | 40x | 80x |
| (3) | 710-850 | 200x | 50x | 100x |
| (4) | 500-600 | 200x | 50x | 100x |
| (5) | 425-500 | 200x | 50x | 100x |
| (6) | 300-355 | 200x | 50x | 100x |
| (7) | 180-212 | 400x | 100x | 200x |

Under the microscope, the nodules appear as bright gray (see FIG. 4). To evaluate the concentration of nodules, the microscope is adjusted to magnification G1 as defined in Table 1. The number of brilliant white points have a size of the at most 10 μm, symptomatic of the presence of nodules, are counted. The number of nodules per $mm^2$ is obtained by dividing the number of nodules by the surface of the zone observed. The concentration of nodules is determined based on an average of three measurements.

Figure 5:
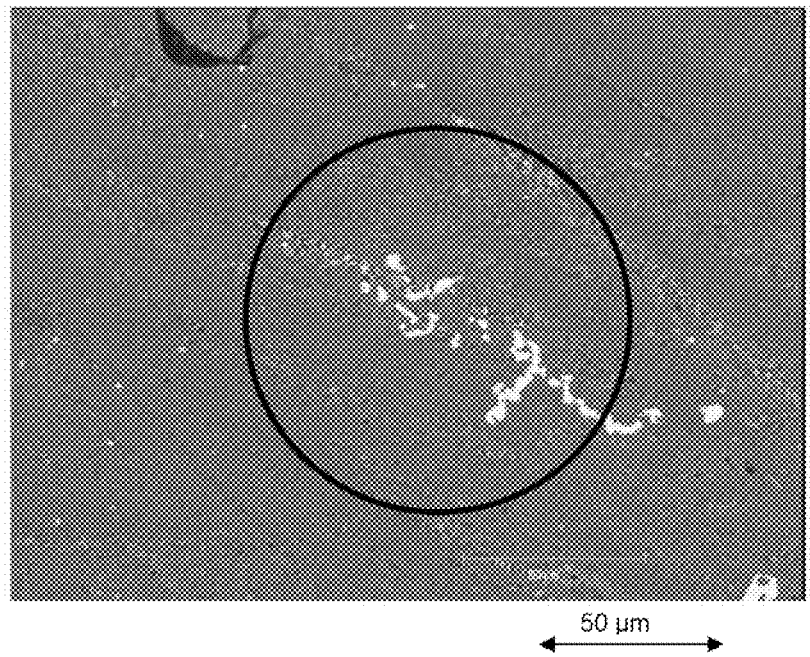

Under the microscope, inclusions appear as bright gray (see FIG. 5). To evaluate the inclusion rate, the microscope is adjusted to magnification G2 as defined in Table 1. The grains having at least one visible inclusion are counted. Counting is performed over the entire diameter 25 mm surface of the polishing. A grain is considered to include an inclusion when at least a brilliant spot of high-carbon origin having a size of at least 10 μm is seen. The inclusion rate is given by the percentage of grains having at least one inclusion.

To measure the primary corundum rate, the microscope is adjusted to magnification G3 as defined in Table 1. The number of grains including at least one primary corundum and the number of grains free from primary corundum are counted until at least 100 grains have been counted. A grain is considered to have primary corundum when at least one primary corundum dendrite is seen. The primary corundum rate is the percentage of grains containing primary corundum.

To measure the primary zirconia the microscope is adjusted to magnification G3 as defined in Table 1. The number of grains including at least one primary zirconia dendrite and the number of grains free from primary zirconia are counted until at least 100 grains have been counted. A grain is considered to have primary zirconia when at least one primary zirconia dendrite is seen. The primary zirconia rate is the percentage of grains containing primary zirconia.

Example 1

Sample 1 is based on fused alumina-zirconia grains produced as described in U.S. Pat. No. 4,457,767, referred to as "standard NZP".

Sample 2 is based on fused alumina-zirconia grains produced as described in FR 2,872,157, referred to as "standard mNZP".

Sample 3 is obtained starting from a mixture of NZP grains, but conforming to at least one of the conditions (1) to (7), referred to as "weak NZP".

Sample 4 is obtained starting from a mixture of mNZP grains, but conforming to at least one of the conditions (1) to (7), referred to as "weak mNZP".

The products given in examples were produced starting from the following raw materials:

Bayer® under-calcined alumina with content of sodium hydroxide of less than 0.3 wt %

Zirconia with $ZrO_2+HfO_2$ content higher than 98 wt % is used for mNZP grains

Zirconia with $ZrO_2+HfO_2$ content higher than 85 wt % is used for NZP grains

Petroleum coke

Metal aluminum chips.

The yttrium oxide, used as additive, is supplied as pure material containing more than 98% yttrium oxide.

The table of FIG. 3 provides the chemical composition and the loose packed density of the grains tested.

The products are prepared according to the conventional process well known to those skilled in the art: mixing of the raw materials; melting in a single-phase electric arc furnace of the Heroult type with graphite electrodes, using a furnace vessel of 0.8 m in diameter, a voltage of 105-150 V, a current of 2200 to 2500 A and a supplied specific electric power of 2.2 to 2.8 kWh/kg of charge. A minimum of 0.5% (up to 3%) of petroleum coke, depending on the state of the furnace, and about 0.5 to 5.5% of aluminum chips is introduced into the charged composition. The molten liquid is then rapidly cooled by means of a device for casting the liquid between thin metal plates, such as that given in U.S. Pat. No. 3,993,119.

For comparative samples 1 and 2, the solid masses are crushed and classified according to their granulometry (standard FEPA).

For sample 3 and 4, the solid masses of NZP and mNZP, respectively, are crushed using a jaw crusher, then filtered using a sieve of 4 mesh (4760 microns). The grains of NZP and mNZP, respectively, passing through the sieve are crushed in a CLERO model BLC 200×200 roller crusher, in one passage, with a flow of 60 kg/h and a pressure with vacuum of 2.5 bars. The two rollers are in contact. The grains of NZP and mNZP, respectively, are then filtered using a SWECO, model 600 LS 24 S 544 separator with suitable sieves in order to obtain the different grits desired. Sample 3 and 4 are controlled with respect of one of the conditions (1) to (7).

Example 2

To evaluate the lifespan of the fused alumina-zirconia grains, the fused alumina-zirconia are fixed on abrasive belts and tested according to the following standardized procedures. 2.3 MRR Wear Rating and 2.3 MRR Wear Volume are determined by grinding ¼ inch×1 inch×8 inch blocks of 304 grade stainless steel using a 2 inch wide, 132 inch long coated abrasive belt running at a rate of 7500 surface feed per minute. A robot feeds each block end on (¼ inch×1 inch end) at a constant metal removal rate of 2.3 in$^3$/min/in for 1.5 seconds. Additional blocks are fed sequentially until a light burn is detected on one of the blocks. The light burn is determined by comparison to a light burn standard. 2.3 MRR Wear Volume is determined by calculating the volume of material removed prior to achieving the light burn and the 2.3 MRR Wear Rating is the percentage of volume removed prior to the light burn relative to a substantially identical coated abrasive article using standard NZP abrasive grain of the same grit size. Similarly, 5.9 MRR Wear Rating and 5.9 MRR Wear Volume are determined using a constant metal removal rate of 5.9 in$^3$/min/in. 5.9 MRR Wear Volume is determined by calculating the volume of material removed prior to achieving the light burn and 5.9 MRR Wear Rating is the percentage of volume removed prior to the light burn relative to a substantially identical coated abrasive article using standard NZP abrasive grain of the same grit size.

Sample 5, 6, 7, and 8 are 24-grit abrasive belt prepared by electrostatically applying appropriately sized grains of Sample 1, 2, 3, and 4 respectively to a backing coated with a make coat. After application of the grain, the article is coated with a size coat and a super-size coat. Test results are shown in Table 2.

TABLE 2

Results for 24-grit abrasive belts

| | 2.3 MRR Wear Volume (in$^3$) | 2.3 MRR Wear Rating | 5.9 MRR Wear Volume (in$^3$) | 5.9 MRR Wear Rating |
|---|---|---|---|---|
| Std NZP (Sample 5) | 152.4 | 100.0 | 135.7 | 100.0 |
| Std mNZP (Sample 6) | 163.3 | 107.2 | 178.5 | 131.5 |
| Weak NZP (Sample 7) | 288.4 | 189.2 | 196.2 | 144.6 |
| Weak mNZP (Sample 8) | 289.2 | 189.8 | 277.3 | 204.3 |

Sample 9, 10, 11, and 12 are 36-grit abrasive belt prepared by electrostatically applying appropriately sized grains of Sample 1, 2, 3, and 4 respectively to a backing coated with a make coat. After application of the grain, the article is coated with a size coat and a super-size coat. Test results are shown in Table 3.

TABLE 3

Results for 36-grit abrasive belts

| | 2.3 MRR Wear Volume (in$^3$) | 2.3 MRR Wear Rating | 5.9 MRR Wear Volume (in$^3$) | 5.9 MRR Wear Rating |
|---|---|---|---|---|
| Std NZP (Sample 9) | 147.2 | 100.0 | 95.9 | 100.0 |
| Std mNZP (Sample 10) | 145.5 | 98.8 | 109.2 | 113.8 |
| Weak NZP (Sample 11) | 153.5 | 104.3 | 98.8 | 103.1 |
| Weak mNZP (Sample 12) | 205.3 | 139.5 | 153.4 | 160.0 |

Sample 13, 14, 15, and 16 are 40-grit abrasive belt prepared by electrostatically applying appropriately sized grains of Sample 1, 2, 3, and 4 respectively to a backing coated with a make coat. After application of the grain, the article is coated with a size coat and a super-size coat. Test results are shown in Table 4.

TABLE 4

Results for 40-grit abrasive belts

| | 2.3 MRR Wear Volume (in$^3$) | 2.3 MRR Wear Rating | 5.9 MRR Wear Volume (in$^3$) | 5.9 MRR Wear Rating |
|---|---|---|---|---|
| Std NZP (Sample 13) | 133.4 | 100.0 | 59.0 | 100.0 |
| Std mNZP (Sample 14) | 93.2 | 69.8 | 42.8 | 72.5 |
| Weak NZP (Sample 15) | 90.9 | 68.1 | 35.4 | 60.0 |
| Weak mNZP (Sample 16) | 159.3 | 119.4 | 79.7 | 135.0 |

Table 4 shows that, contrary to teaching U.S. Pat. No. 5,161,696, a grain having a reduced LPD (weak grain) may not improve the lifespan compared to a standard grain. Specifically, for a P36 granulometry, the weak NZP has a substantially similar lifespan as compared to the standard NZP.

Tables 2-4 also show the importance of the granulometric distribution to obtain an lifespan improvement for the abrasive. For a P24 granulometry, the weak NZP has a significantly improved lifespan compared to the standard NZP, whereas for a P36 granulometry, the lifetime is substantially similar.

A comparison of the performances of the NZP grains and mNZP grains show a considerable impact of the chemical composition and microstructure.

For the 5.9 MRR tests, a comparison of the weak grains to the standard grains shows an improvement of a factor of 1.44 for the NZP grains and 1.55 for the mNZP grains for the 24-grit abrasive; an improvement of a factor of 1.03 for the NZP grains and 1.41 for the mNZP grains for the 36 grit abrasive; and an improvement of a factor of 1.86 for the mNZP grains for the 40 grit abrasive.

While the effect of the change in the shape of the grains is variable for the NZP grains, the effect is consistently positive, and even remarkably positive, for the mNZP grains. Unexpectedly, the inventors thus highlighted a true synergy between the characteristics of composition and form. To obtain this synergy, the criterion of form must however be adapted to the granulometry of the powder.

Similarly, for the 2.6 MRR tests, a comparison of the weak grains to the standard grains shows an improvement of a factor of 1.89 for the NZP grains and 1.77 for the mNZP grains for the 24-grit abrasive; an improvement of a factor of 1.04 for the NZP grains and 1.41 for the mNZP grains for the 36 grit abrasive; and an improvement of a factor of 1.71 for the mNZP grains for the 40 grit abrasive.

The inventors thus discovered, for a given chemical composition imposing limits on both the loose packed density and the granulometric distribution of an abrasive grains can improve performance. In an embodiment, the fused alumina-zirconia abrasive grains can have an increased lifespan, and in particular can have a lifespan of 30%, 40%, even 50% higher than the standard fused alumina-zirconia abrasive grains.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A coated abrasive article comprising:
    a backing;
    fused alumina-zirconia abrasive grains attached to the backing with a binder, the fused alumina-zirconia abrasive grains including
       between about 35 wt % and about 45.5 wt % $ZrO_2$+$HfO_2$,
       between about 43.7 wt % and about 65 wt % Al2O3,
       less than about 0.8 wt % $SiO_2$ and
       less than about 10 wt % other oxides,
    wherein the fused alumina-zirconia abrasive grains conform to at least one of the following conditions:
       (1) at least about 97 wt % of the grains do not cross a 1400 μm square mesh sieve and at most about 20 wt % of the grains do not cross a 2360 μm square mesh sieve, and the loose packed density is between about 2.18 and about 2.43 g/cm$^3$;
       (2) at least about 96 wt % of the grains do not cross a 1000 μm square mesh sieve and at most about 3 wt % of the grains do not cross a 1700 μm square mesh sieve, and the loose packed density is between about 2.04 and about 2.26 g/cm$^3$;
       (3) at least about 92 wt % of the grains do not cross a 600 μm square mesh sieve and at most about 18 wt % of the grains do not cross a 850 μm square mesh sieve, and the loose packed density is between about 1.94 and about 2.17 g/cm$^3$;
       (4) not more than 5% of the grains contain inclusions, at least 50% of the grains containing at least about 500 nodules per mm$^2$, at least about 92 wt % of the grains do not cross a 425 μm square mesh sieve and at most about 18 wt % of the grains does not cross a 600 μm square mesh sieve, and the loose packed density is between about 1.85 and about 2.05 g/cm$^3$;
       (5) not more than 5% of the grains contain inclusions, at least 50% of the grains containing at least about 500 nodules per mm$^2$, at least about 96 wt % of the grains do not cross a 300 μm square mesh sieve and at most about 7 wt % of the grains do not cross a 500 μm square mesh sieve, and the loose packed density is between about 1.83 and about 2.00 g/cm$^3$;
       (6) not more than 5% of the grains contain inclusions, at least 50% of the grains containing at least about 500 nodules per mm$^2$, at least to about 96 wt % of the grains do not cross a 250 μm square mesh sieve and at most about 3 wt % of the grains do not cross a 425 μm square mesh sieve, and the loose packed density is at least about 1.86 and not greater than about 1.93 g/cm$^3$;
       (7) not more than 5% of the grains contain inclusions, at least 50% of the grains containing at least about 500 nodules per mm$^2$, at least about 96 wt % of the grains do not cross a 150 μm square mesh sieve and at most about 3 wt % of the grains do not cross a 250 μm square mesh sieve, and the loose packed density is between about 1.79 and about 1.93 g/cm$^3$.

2. The coated abrasive article of claim 1, wherein the other oxides include yttrium oxide, titanium oxide, magnesium oxide, calcium oxide, rare earth oxide, or any combination thereof.

3. The coated abrasive article of claim 2, wherein the rare earth oxides includes oxides of neodymium, lanthanum, cerium, dysprosium, erbium, or any combination thereof.

4. The coated abrasive article of claim 2, wherein the fused alumina-zirconia abrasive grains include between about 0.1 wt % and about 1.2 wt % $Y_2O_3$, less than about 3.0 wt % $TiO_2$, and less than about 0.4 wt % $SiO_2$.

5. The coated abrasive article of claim 1, wherein the fused alumina-zirconia abrasive grains include between about 38.0 wt % and about 45.5 wt % $ZrO_2$+$HfO_2$, between about 43.7 wt % and about 62.0 wt % $Al_2O_3$, less than 0.8 wt % $SiO_2$, and less than about 10.0 wt % other oxides.

6. The coated abrasive article of claim 5, wherein the fused alumina-zirconia abrasive grains include between about 40.0 wt % and about 45.5 wt % $ZrO_2$+$HfO_2$, between about 43.7 wt % and about 60.0 wt % $Al_2O_3$, less than 0.8 wt % $SiO_2$, and less than about 10.0 wt % other oxides.

7. The coated abrasive article of claim 1, wherein
    the loose packed density of condition (1) is between about 2.22 and about 2.36 g/cm$^3$;
    the loose packed density of condition (2) is between about 2.08 and about 2.19 g/cm$^3$;
    the loose packed density of condition (3) is between about 1.98 and about 2.10 g/cm$^3$;
    the loose packed density of condition (4) is between about 1.89 and about 2.00 g/cm$^3$;
    the loose packed density of condition (5) is between about 1.86 and about 1.97 g/cm$^3$;
    the loose packed density of condition (6) is at least about 1.86 and not greater than about 1.93 g/cm$^3$; and the loose packed density of condition (7) is between about 1.83 and about 1.91 g/cm³.

8. The coated abrasive article of claim 1, wherein the fused alumina-zirconia abrasive grains conforming to conditions (1), (2), (3), (4), (5), (6) or (7) represent Grit F10, P16, P24, P36, P40, P50 or P80, respectively, the grit F10 being measured according to standard FEPA Standard 42-GB 1984, R 1993 of the European Federation of the Manufacturers of Grittings and the grits P16, P24, P36, P40, P50 or P80 being measured according to standard FEPA Standard 43-GB 1984, R 1993 of the European Federation of the Manufacturers of Grittings.

9. The coated abrasive article of claim 1,
wherein the coated abrasive article has a 2.3 MRR Wear Rating of at least about 105 or a 5.9 MRR Wear Rating of at least about 110.

10. The coated abrasive article of claim 9, wherein between about 20% and 45% of the fused alumina-zirconia abrasive grains contain primary zirconia.

11. The coated abrasive article of claim 9, wherein between about 0% and 20% of the fused alumina-zirconia abrasive grains contain primary corundum.

12. The coated abrasive article of claim 9, wherein not more than 5% of the grains contain inclusions, and at least 50% of the grains contain at least about 500 nodules per mm².

13. The coated abrasive article of claim 12, wherein not more than about 2% of the grains contain inclusions.

14. The coated abrasive article of claim 12, wherein at least 90% of the grains contain at least about 500 nodules per mm².

15. The coated abrasive article of claim 12, wherein at least 50% of the grains contain at least about 600 nodules per mm².

16. The coated abrasive article of claim 9, wherein the fused alumina-zirconia abrasive grains include between about 38.0 wt % and about 45.5 wt % $ZrO_2+HfO_2$, between about 43.7 wt % and about 62.0 wt % $Al_2O_3$, less than 0.8 wt % $SiO_2$, and less than about 10.0 wt % other oxides.

17. The coated abrasive article of claim 16, wherein the fused alumina-zirconia abrasive grains include between about 40.0 wt % and about 45.5 wt % $ZrO_2+HfO_2$, between about 43.7 wt % and about 60.0 wt % $Al_2O_3$, less than 0.8 wt % $SiO_2$, and less than about 10.0 wt % other oxides.

18. The coated abrasive article of claim 9, wherein the coated abrasive article is one of (i) a 24-Grit coated abrasive article and the 2.3 MRR Wear Rating is at least about 150 or the 5.9 MRR Wear Rating is at least about 140, (ii) a 36-Grit coated abrasive article and the 2.3 MRR Wear Rating is at least about 110 or the 5.9 MRR Wear Rating is at least about 120, and (iii) a 40-Grit coated abrasive article and the 2.3 MRR Wear Rating is at least about 110 or the 5.9 MRR Wear Rating is at least about 120.

19. The coated abrasive article of claim 9, wherein the coated abrasive article is one of (i) a 24-Grit coated abrasive article having a 2.3 MRR Wear Volume of at least about 170 in³ or a 5.9 MRR Wear Volume of at least about 180 in³, (ii) a 36-Grit coated abrasive article having a 2.3 MRR Wear Volume of at least about 150 in³ or a 5.9 MRR Wear Volume of at least about 110 in³, and (iii) a 40-Grit coated abrasive article having a 2.3 MRR Wear Volume of at least about 135 in³ or a 5.9 MRR Wear Volume of at least about 65 in³.

20. The coated abrasive article of claim 1, wherein the fused alumina-zirconia abrasive grains have a lengthened form.

21. The coated abrasive article of claim 1, wherein the fused alumina-zirconia abrasive grains are roller crushed.

22. A method of forming a coated abrasive article, comprising:
applying a coating to a backing; and
applying fused alumina-zirconia abrasive grains to the coating, the fused alumina-zirconia abrasive grains including between about 35 wt % and about 45.5 wt % $ZrO_2+HfO_2$, between about 43.7 wt % and about 65 wt % $Al_2O_3$, less than about 0.8 wt % $SiO_2$ and less than about 10 wt % other oxides,
wherein the fused alumina-zirconia abrasive grains conform to at least one of the following conditions:
(1) at least about wt % of the grains do not cross a 1400 μm square mesh sieve and at most about 20 wt % of the grains do not cross a 2360 μm square mesh sieve, and the loose packed density is between about 2.18 and about 2.43 g/cm³;
(2) at least about 96 wt % of the grains do not cross a 1000 μm square mesh sieve and at most about 3 wt % of the grains do not cross a 1700 μm square mesh sieve, and the loose packed density is between about 2.04 and about 2.26 g/cm³;
(3) at least about 92 wt % of the grains do not cross a 600 μm square mesh sieve and at most about 18 wt % of the grains do not cross a 850 μm square mesh sieve, and the loose packed density is between about 1.94 and about 2.17 g/cm³;
(4) not more than 5% of the grains contain inclusions, at least 50% of the grains containing 500 nodules per mm², at least about 92 wt % of the grains do not cross a 425 μm square mesh sieve and at most about 18 wt % of the grains does not cross a 600 μm square mesh sieve, and the loose packed density is between about 1.85 and about 2.05 g/cm³;
(5) not more than 5% of the grains contain inclusions, at least 50% of the grains containing 500 nodules per mm², at least about 96 wt % of the grains do not cross a 300 μm square mesh sieve and at most about 7 wt % of the grains do not cross a 500 μm square mesh sieve, and the loose packed density is between about 1.83 and about 2.00 g/cm³;
(6) not more than 5% of the grains contain inclusions, at least 50% of the grains containing 500 nodules per mm², at least about 96 wt % of the grains do not cross a 250 μm square mesh sieve and at most about 3 wt % of the grains do not cross a 425 μm square mesh sieve, and the loose packed density is between about 1.82 and about 1.95 g/cm³;
(7) not more than 5% of the grains contain inclusions, at least 50% of the grains containing 500 nodules per mm², at least about 96 wt % of the grains do not cross a 150 μm square mesh sieve and at most about 3 wt % of the grains do not cross a 250 μm square mesh sieve, and the loose packed density is between about 1.79 and about 1.93 g/cm³.

23. The method of claim 22, wherein not more than 5% of the grains contain inclusions, and at least 50% of the grains containing at least about 500 nodules per mm².

24. The method of claim 23, wherein not more than about 2% of the grains contain inclusions.

25. A method of forming a coated abrasive article, comprising:
combining a fused alumina-zirconia abrasive grains with a polymer to form a slurry, the fused alumina-zirconia abrasive grains including between about 35 wt % and about 45.5 wt % $ZrO_2+HfO_2$, between about 43.7 wt % and about 65 wt % $Al_2O_3$, less than about 0.8 wt % $SiO_2$ and less than about 10 wt % other oxides;
coating a backing with the slurry; and
curing the polymer, wherein the fused alumina-zirconia abrasive grains conform to at least one of the following conditions:
(1) at least about 97 wt % of the grains do not cross a 1400 μm square mesh sieve and at most about 20 wt % of the grains do not cross a 2360 μm square mesh sieve, and the loose packed density is between about 2.18 and about 2.43 g/cm$^3$;
(2) at least about 96 wt % of the grains do not cross a 1000 μm square mesh sieve and at most about 3 wt % of the grains do not cross a 1700 μm square mesh sieve, and the loose packed density is between about 2.04 and about 2.26 g/cm$^3$;
(3) at least about 92 wt % of the grains do not cross a 600 μm square mesh sieve and at most about 18 wt % of the grains do not cross a 850 μm square mesh sieve, and the loose packed density is between about 1.94 and about 2.17 g/cm$^3$;
(4) not more than 5% of the grains contain inclusions, at least 50% of the grains containing 500 nodules per mm$^2$, at least about 92 wt % of the grains do not cross a 425 μm square mesh sieve and at most about 18 wt % of the grains does not cross a 600 μm square mesh sieve, and the loose packed density is between about 1.85 and about 2.05 g/cm$^3$;
(5) not more than 5% of the grains contain inclusions, at least 50% of the grains containing 500 nodules per mm$^2$, at least about 96 wt % of the grains do not cross a 300 μm square mesh sieve and at most about 7 wt % of the grains do not cross a 500 μm square mesh sieve, and the loose packed density is between about 1.83 and about 2.00 g/cm$^3$;
(6) not more than 5% of the grains contain inclusions, at least 50% of the grains containing 500 nodules per mm$^2$, at least about 96 wt % of the grains do not cross a 250 μm square mesh sieve and at most about 3 wt % of the grains do not cross a 425 μm square mesh sieve, and the loose packed density is at least about 1.82 and at least about 1.95 g/cm$^3$;
(7) not more than 5% of the grains contain inclusions, at least 50% of the grains containing 500 nodules per mm$^2$, at least about 96 wt % of the grains do not cross a 150 μm square mesh sieve and at most about 3 wt % of the grains do not cross a 250 μm square mesh sieve, and the loose packed density is between about 1.79 and about 1.93 g/cm$^3$.

* * * * *

UNITED STATES PATENT AND TRADEMARK OFFICE
CERTIFICATE OF CORRECTION

| | | |
|---|---|---|
| PATENT NO. | : 8,545,582 B2 | Page 1 of 1 |
| APPLICATION NO. | : 12/722295 | |
| DATED | : October 1, 2013 | |
| INVENTOR(S) | : Anthony C. Gaeta | |

It is certified that error appears in the above-identified patent and that said Letters Patent is hereby corrected as shown below:

In the Claims

Claim 22, column 16, line 9, please delete "about wt %" and insert therefor --about wt 97%--.

Signed and Sealed this
Seventeenth Day of February, 2015

Michelle K. Lee
*Deputy Director of the United States Patent and Trademark Office*